United States Patent
Feldhaus et al.

(10) Patent No.: US 9,613,606 B2
(45) Date of Patent: Apr. 4, 2017

(54) MOTOR VEHICLE HAVING AT LEAST ONE SOUND-GENERATING SYSTEM FOR PRODUCING AN ARTIFICIAL ENGINE NOISE

(71) Applicant: Volkswagen Aktiengesellschaft, Wolfsburg (DE)

(72) Inventors: Jens Feldhaus, Wasbuettel (DE); Carsten Lutter, Berlin (DE); Denis Dupper, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 29 days.

(21) Appl. No.: 14/684,877

(22) Filed: Apr. 13, 2015

(65) Prior Publication Data
US 2015/0221295 A1    Aug. 6, 2015

Related U.S. Application Data

(63) Continuation of application No. PCT/EP2013/071324, filed on Oct. 11, 2013.

(30) Foreign Application Priority Data

Oct. 12, 2012   (DE) .................. 10 2012 025 584
Oct. 12, 2012   (DE) .................. 10 2012 025 585

(51) Int. Cl.
*G10H 1/00*  (2006.01)
*H03G 3/00*  (2006.01)
(Continued)

(52) U.S. Cl.
CPC ........... *G10H 1/0091* (2013.01); *B60C 5/008* (2013.01); *G10K 9/122* (2013.01); *G10K 9/22* (2013.01);
(Continued)

(58) Field of Classification Search
CPC ........ G10H 1/0091; B60C 5/008; G10K 9/22; G10K 9/122; H04R 2499/13; H04R 1/028
See application file for complete search history.

(56) References Cited

U.S. PATENT DOCUMENTS 7,641,267 B2    1/2010 Makino
2009/0314575 A1   12/2009 Reiche
(Continued)

FOREIGN PATENT DOCUMENTS

CN    101391588 A    3/2009
CN    101565017 A    10/2009
(Continued)

OTHER PUBLICATIONS

Office Action for Chinese Patent Application No. 201380053396.X; Nov. 2, 2016.

*Primary Examiner* — Muhammad N Edun
(74) *Attorney, Agent, or Firm* — Barnes & Thornburg LLP

(57) ABSTRACT

A motor vehicle having at least one sound generating system for generating an artificial engine noise, which has at least one electrically controllable vibration exciter, wherein the vibration exciter is fastened to a component that is acoustically and/or vibrationally decoupled from a body of the motor vehicle. The component is retained on the motor vehicle by a retaining device, which covers the component at least to a large extent. By means of this measure, the acoustic properties of the sound-generating system can be significantly improved.

20 Claims, 10 Drawing Sheets

(51) Int. Cl.
*G10K 9/22* (2006.01)
*B60C 5/00* (2006.01)
*G10K 9/122* (2006.01)
*H04R 1/02* (2006.01)

(52) U.S. Cl.
CPC ......... H04R 1/028 (2013.01); *H04R 2499/13* (2013.01)

(56) References Cited

U.S. PATENT DOCUMENTS

2010/0245069 A1* 9/2010 Noro .................. B60Q 5/008
 340/441
2011/0188663 A1* 8/2011 Nakayama ............. G10K 15/02
 381/57

FOREIGN PATENT DOCUMENTS

| | | |
|---|---|---|
| CN | 102259665 A | 11/2011 |
| DE | 739 790 C | 10/1943 |
| DE | 10 2008 027 454 A1 | 1/2009 |
| DE | 102008009527 A1 | 8/2009 |
| DE | 10 2006 040 344 A1 | 4/2011 |
| DE | 10 2009 047 930 A1 | 4/2011 |
| DE | 10 2010 005 138 A1 | 7/2011 |
| DE | 10 2011 109 719 A1 | 4/2012 |
| DE | 10 2011 119 463 A1 | 5/2012 |
| KR | 20100094429 A | 8/2010 |
| WO | WO 99/14981 A1 | 3/1999 |
| WO | WO 2004/030407 A2 | 4/2004 |
| WO | WO 2011/141982 A1 | 11/2011 |

* cited by examiner

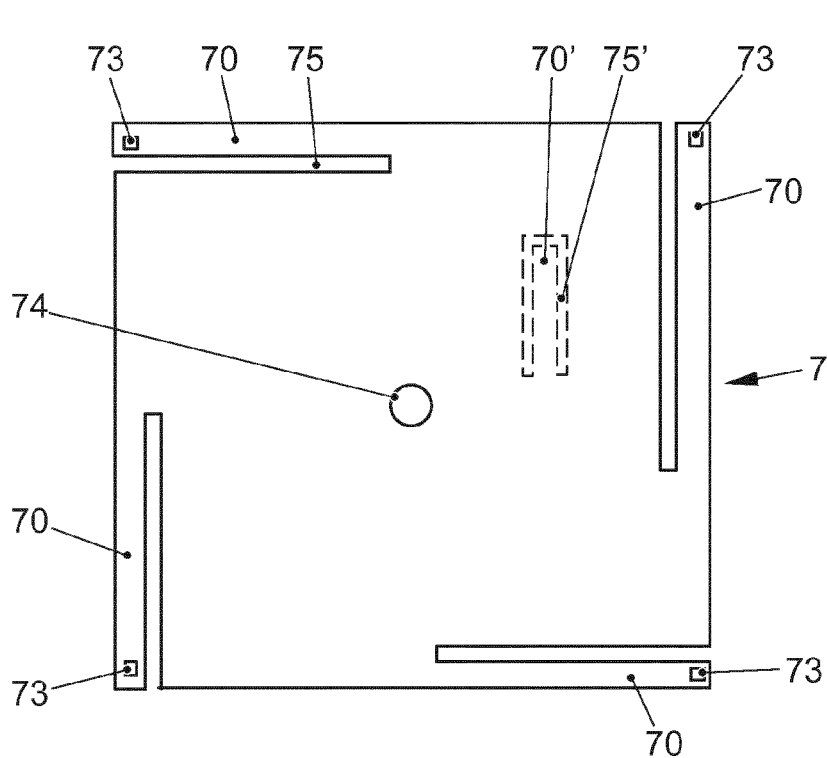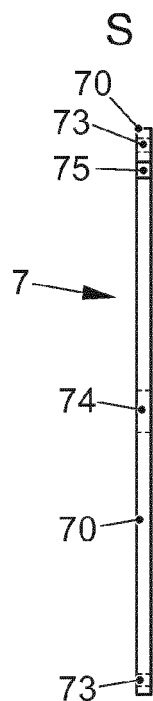
FIG. 7a  FIG. 7b
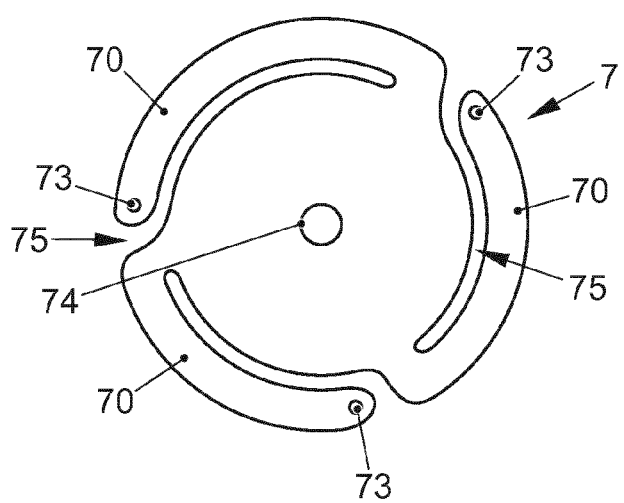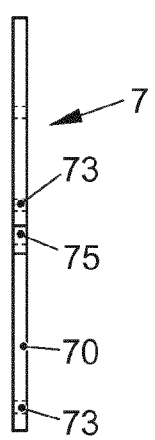
FIG. 8a  FIG. 8b

MOTOR VEHICLE HAVING AT LEAST ONE SOUND-GENERATING SYSTEM FOR PRODUCING AN ARTIFICIAL ENGINE NOISE

This nonprovisional application is a continuation of International Application No. PCT/EP2013/071324 which was filed on Oct. 11, 2013 and which claims priority to German Patent Application No. 10 2012 025 584.5, which was filed in Germany on Oct. 12, 2012, and to German Patent Application No. 10 2012 025 585.3, which was filed in Germany on Oct. 12, 2012, and all of which are herein incorporated by reference.

BACKGROUND OF THE INVENTION

Field of the Invention

The present invention relates to a motor vehicle having at least one sound-generating system for generating an artificial engine noise and to a support structure for a motor vehicle.

Description of the Background Art

Motor vehicles, which can also be driven at least at times without an internal combustion engine, especially hybrid, electric, and fuel cell vehicles, are very quiet when the propulsion occurs solely without a combustion engine. This applies especially at a slow speed, for example, in a residential area. This results in an increased risk of accidents for pedestrians or cyclists who usually expect the loud noise of a combustion engine when a motor vehicle approaches.

For this reason, there are legal requirements worldwide, or they are being prepared, that call for exterior noise for such "silent" motor vehicles in the range of 0 to about 50 km/h, because the noise produced thus far by combustion engines can be absent at least at times.

A motor vehicle is known from DE 10 2010 005 138 A1. The sound-generating system in this case consists of a vibration generator, disposed on an exhaust muffler of an exhaust gas system of the motor vehicle.

Such a solution is not optimal with respect to sound radiation or acoustic properties and thus to the warning effect for pedestrians and the like.

In addition, the long-term stability of such a solution is arguable on account of the enormous heat generation in the case of direct contact with such an exhaust gas unit and the direct, unprotected proximity of the ground.

SUMMARY OF THE INVENTION

It is therefore an object of the present invention to provide an improved motor vehicle with respect to at least the acoustic properties of the sound-generating system.

In an embodiment, the invention is based on a motor vehicle having at least one sound-generating system for generating an artificial engine noise, which has at least one electrically controllable vibration exciter, whereby the vibration exciter is fastened to a component that is acoustically and/or vibrationally decoupled from the vehicle body.

It is provided according to an embodiment of the invention that the component for its part is retained on the motor vehicle by a retaining device, which covers the component at least to a large extent.

The acoustic properties of the sound-generating system can be improved considerably by this measure. In particular, surprisingly the cutoff frequency of the sound-generating system at which loss of sound pressure occurs can be shifted thereby considerably toward lower frequencies. An embodiment provides that the vibration exciter is fastened to such a side of the component that is covered at least to a large extent by the retaining device. This results in better protection of the vibration exciter from environmental effects and thereby in an increase in the functional reliability and long-term stability.

According to an embodiment, it is provided that the retaining device has an opening, which is located in the area of the vibration exciter and surrounds the exciter. Because of this, part of the vibration exciter in the case of vibrations can project unimpeded through the opening, which enables a very compact construction of the retaining device. The opening can be selected as approximately circular and as small as possible, so that it surrounds the vibration exciter in the immediate vicinity, preferably approximately concentrically.

According to an embodiment of the invention, the opening can be closed by an air-permeable and flexible material. The material can be made, for example, foam-like. As a result, despite further improvement of the acoustic properties the mobility of the vibration exciter remains unimpeded.

Optimal results with respect to acoustic properties can be achieved when the component is completely covered by the retaining device.

The retaining device can be formed as a single piece. As a result, advantages can be achieved with respect to fabrication and installation costs and also with respect to long-term stability.

The component can be formed flat. Flat here can be, for example, that the surface extension of the component is many times greater than its thickness. The component can be caused to vibrate especially well due to the flat design thereof. Moreover, this type of embodiment contributes to a compact construction.

According to an embodiment, the component can have tongue-like elements, integrally connected thereto. The component can be fastened to the retaining device by the tongue-like elements most effectively in a vibrationally decoupled manner.

To improve still further the acoustic and/or vibrational decoupling of the component from the body, the component can be fastened acoustically and/or vibrationally decoupled to the retaining device and the device is fastened again acoustically and/or vibrationally decoupled to a different component of the motor vehicle. The different component can be, for example, a hood or trunk lid.

The installation is simplified, if the retaining device has a depression into which the component retaining the vibration exciter is inserted.

To facilitate the integration of the component into the motor vehicle in tight spaces as well, it is proposed to give the component an approximately circular shape in outline.

A further embodiment of the invention provides for the fastening of the component to such a support structure on which at least one radiator as well is retained in any event. Such a support structure, which is installed in the front end of a motor vehicle, is used for installing a plurality of individual components, such as, for example, a radiator and a fan, and thus represents an integration platform for a plurality of individual components in the front end. This type of support structure is therefore also sometimes called a "mounting support" or "structural support." It can include, for example, of plastic, aluminum, or steel and is also produced increasingly as a hybrid component of said materials (PP or PR plastic/steel).

Because such a support structure is present anyway in the front end, a sound-generating system can be provided cost-effectively by the solution of the invention and in the case of a small space requirement. Moreover, optimal sound radiation in the direction of travel is possible because of the positioning in the front end, namely, in the immediate vicinity of the radiator.

A further embodiment of the invention provides that the component can be fastened acoustically and/or vibrationally decoupled to an engine shield.

To reduce the sound emission downward (in the direction of the ground or roadway), an engine shield therefore can have a wall, which can be connected below the engine to the body, oriented approximately horizontally, and positioned approximately at the level of the underbody and connected to it at that point. In addition or alternatively, to reduce the lateral sound radiation, approximately vertically arranged walls can also be part or the object of an engine shield. A wall arranged above the engine can also be found in addition at times, so that the engine shield is configured nearly in the shape of a capsule. It is also conceivable and often typical that the engine shield comprises only a bottom wall.

Therefore an engine shield wall already present in any case can be used to fasten the sound-generating system cost-effectively. Because of the naturally extensive walls of an engine shield, the component carrying the vibration exciter can also be larger, which is favorable for generating lower frequencies in the range of 200 Hz.

The positioning of the sound-generating system in the vicinity of the engine promotes a sound radiation that is perceived as natural and coming from the engine.

According to an embodiment of the invention, the component can be fastened to a bottom wall of the engine shield. It usually has an especially large surface extension with the already mentioned advantages for the component supporting the vibration exciter.

It is also possible alternatively or in addition, however, to fasten the component to an upper wall of the engine shield.

A support structure for a motor vehicle is also provided. The support structure can hold at least one radiator and at least one component connected to at least one vibration exciter, whereby the component can be retained acoustically and/or vibrationally decoupled on a retaining device for the component and can be covered by it at least to a large extent.

Such a support structure can be installed in the motor vehicle in the production process as a prefabricated, highly integrated supplied component and thus can contribute to saving installation time and costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 7a illustrates the flat component, illustrated without a vibration exciter, in an embodiment;

FIG. 7b illustrates the flat component of FIG. 7a in a side view;

FIG. 8a illustrates the flat component, illustrated without a vibration exciter, in an embodiment;

FIG. 8b illustrates the flat component of FIG. 8a in a side view;

DETAILED DESCRIPTION

Figure 1:
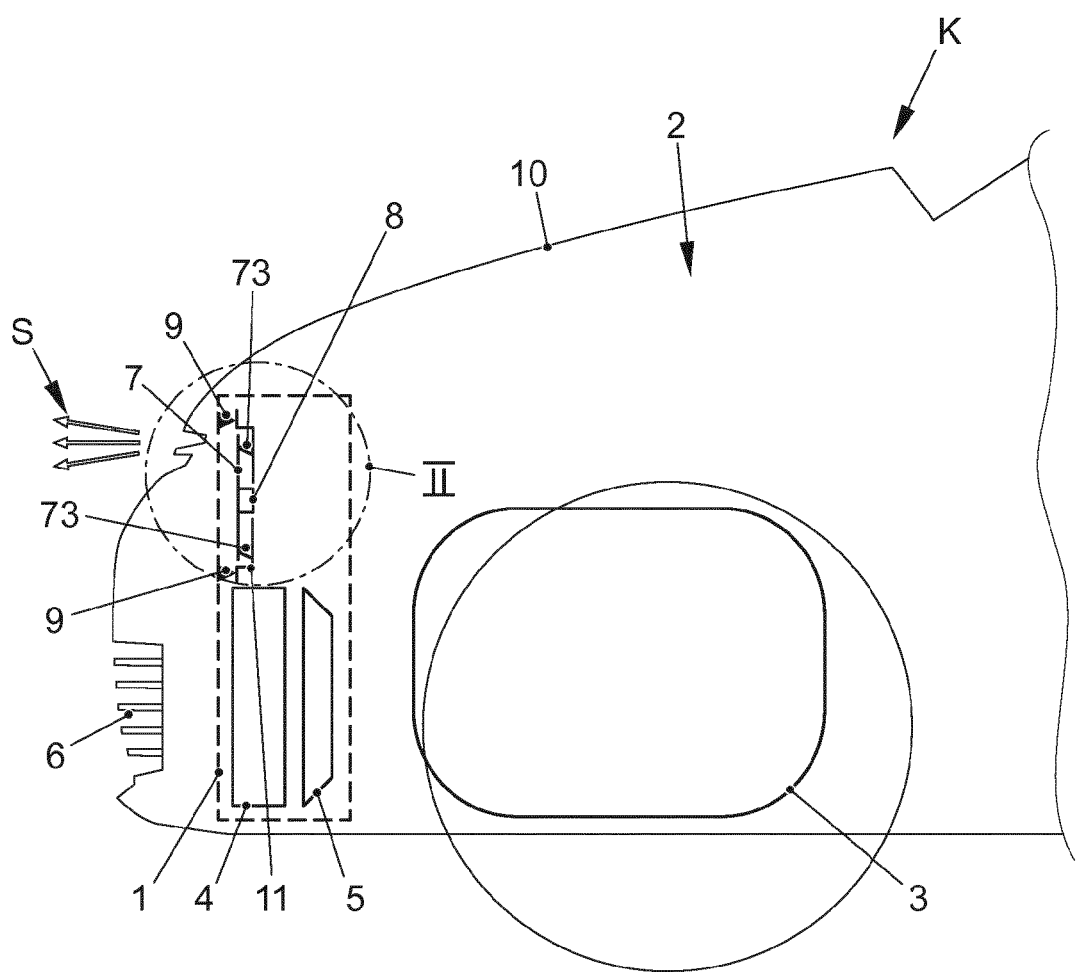
FIG. 1 illustrates a front part of a motor vehicle from a side according to an embodiment of the invention.

A motor vehicle K, made as an all-electric vehicle, can be seen in FIG. 1. Of course, the solution of the invention can also be used advantageously for other motor vehicles that can be driven "without noise," as mentioned, for example, in the introduction to the description, for example electric vehicles.

Vehicle K has an engine compartment 2 that can be covered by a hood 10 with an electric motor 3, used for traction of motor vehicle K.

A support structure 1 (mounting support) at whose bottom area a radiator 4 and a fan 5 are mounted or taken up can be seen in the front area of vehicle K (so-called front end).

Radiator 4 is used for cooling power electronics and power units such as, for example, those of electric motor 3.

Air intakes 6 are provided in front of radiator 4, so that incoming air can reach radiator 4 more easily while vehicle K is being driven.

A plate-like component 7 is fastened above radiator 4 to mounting support 1 by means of a frame-like retaining part 11. A vibration exciter 8 is attached in turn to component 7 approximately in the middle of the surface extension of plate-like component 7.

Vibration exciter 8 can operate, for example, piezoelectrically, electrostatically, magnetically, electromagnetically, or in some other suitable manner. It is used for the vibrational excitation of plate-like component 7, whereby the frequencies of vibration exciter 3 can be controlled. Necessary electrical connections are not shown in greater detail.

In order to optimally decouple plate-like component 7 vibrationally and/or acoustically from the body of motor vehicle K, component 7 is connected at fastening points 73 in a vibrationally decoupled manner to frame-like retaining part 11, and frame-like retaining part 11 is connected in turn via vibrationally decoupled fastening elements 9 to mounting support 1. Fastening elements 9 are preferably made as multicomponent parts (for example, steel/elastomer).

Very good sound radiation S in the direction of travel and thereby an extremely good warning effect for passersby are possible by positioning component 7 together with vibration exciter 8 in mounting support 1.

Figure 2:
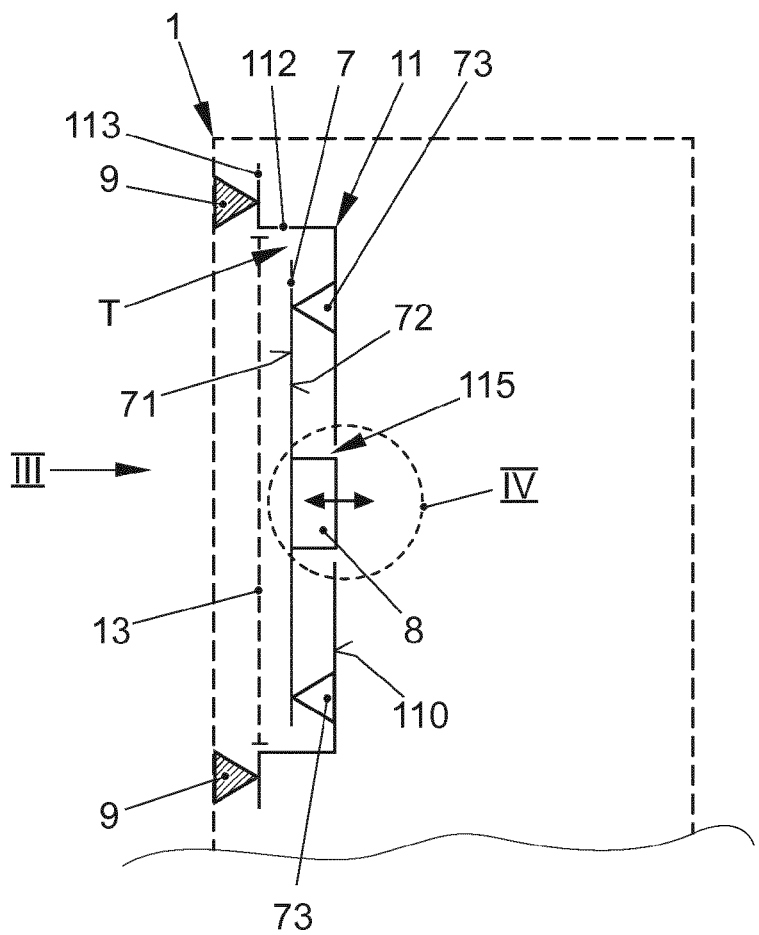
FIG. 2 is an enlarged view according to view II of FIG. 1.
Figure 3:
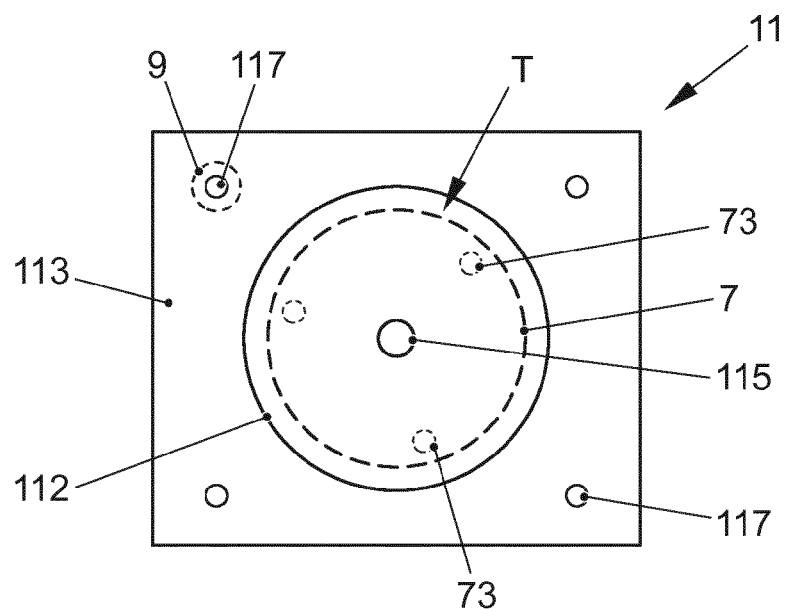
FIG. 3 is a top plan view of the retaining device for the plate-like component, retaining the vibration exciter, according to view III of FIG. 2.

FIGS. 2 and 3 show that frame-like retaining part 11 has a circular, plate-like depression T, in which component 7 (cf. also FIG. 8) is inserted and is connected in a vibrationally decoupled manner at fastening points 73 (openings) to retaining part 11.

Depression T is surrounded by a flange-like frame 113, which likewise has fastening points 117 (openings), in order to mount retaining part 11 at said fastening points 117 by means of vibrationally decoupled fastening elements 9 (not shown in greater detail) on support structure 1.

Depression T is formed by a circumferential, lateral wall 112, which merges into a back wall 110. "Back" in this case therefore means facing engine 3 (cf. also FIG. 1). As is evident, wall 110 of retaining part 11 covers a large part of a back side 72, facing it, of plate-like component 7, so that back wall 72 of component 7 is no longer visible to a great extent. Only a preferably circular opening 115 remains in the center of wall 110. Opening 115 surrounds vibration exciter 8 in the immediate vicinity, preferably concentrically. With good shielding, an unimpeded mobility of vibration exciter 8 can be assured by opening 115, which is preferably only slightly larger in its diameter than the surface extension of vibration exciter 8 in the same direction. An overall flat and compact construction of retaining part 11 is also possible thereby.

Further, there can be a front grille 13 for better protection of a front side 71 of component 7, said side otherwise not covered by retaining part 11.

Figure 4:
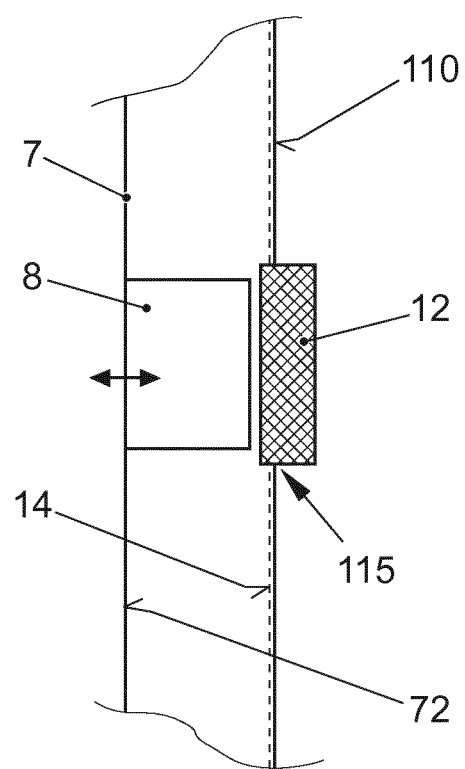
FIG. 4 is an enlarged view according to view IV of FIG. 2, but in a further embodiment.

It is shown in FIG. 4 that opening 115 can be provided with a cover 12. Cover 12 is flexible and air-permeable and can be formed of foam, for example.

In addition or alternatively, back wall 110 can have a sound-absorbing surface 14. Said surface can be connected integrally to wall 110 or also be formed as a sound-absorbing coating (e.g., nonwoven material).

Retaining part 11 in the exemplary embodiments is formed as a single piece. In a departure therefrom, it is naturally conceivable to configure retaining part 11 in the form of multiple parts as well.

Figure 5:
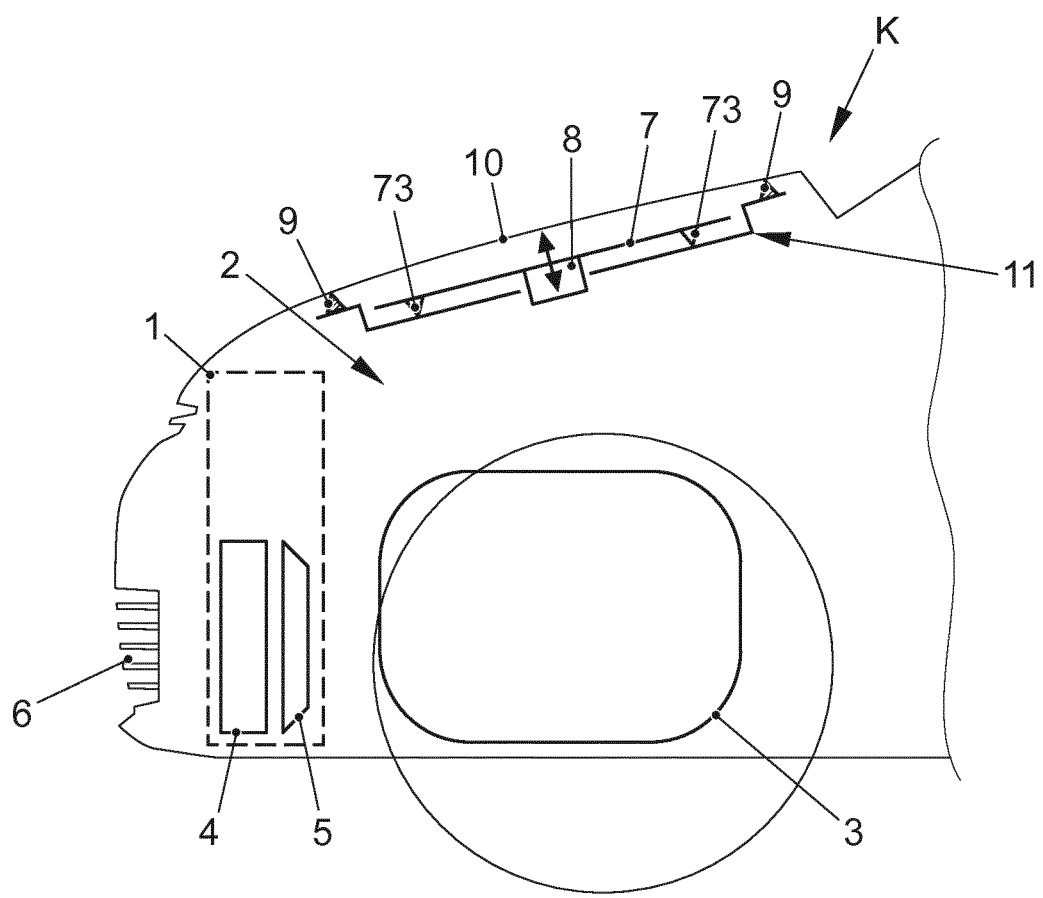
FIG. 5 illustrates the front part of a motor vehicle from a side in an embodiment of the invention.

It can be gathered from FIG. 5 that retaining part 11 for the sound-generating system (7, 8) can also be attached in the same way to hood 10.

Figure 6:
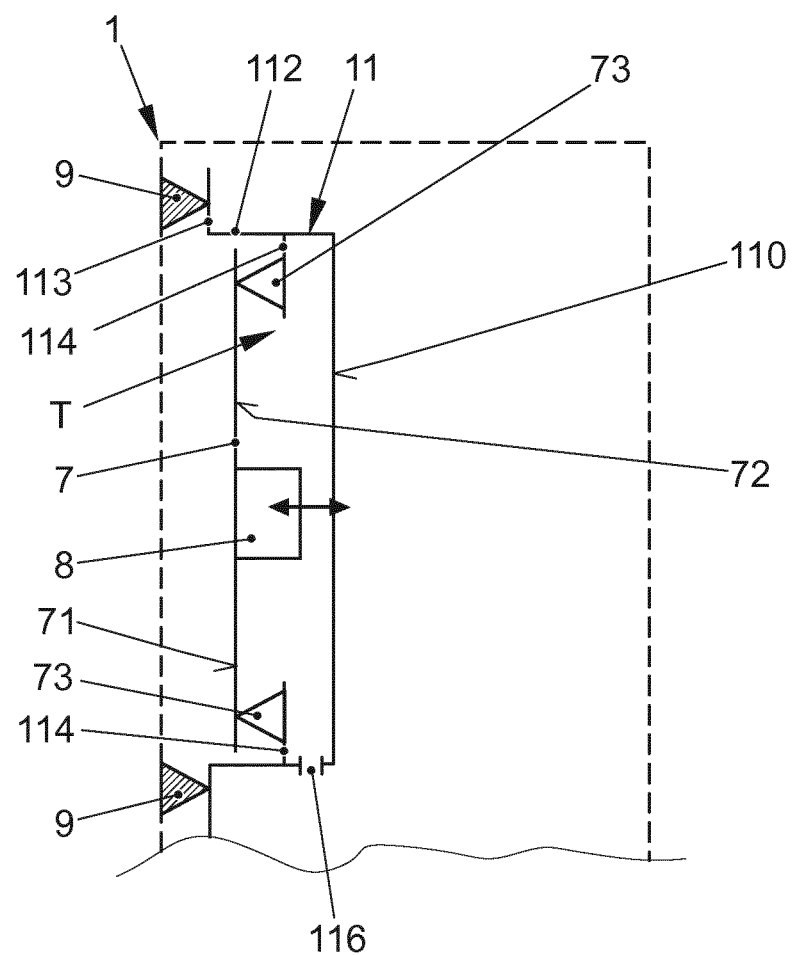
FIG. 6 illustrates a view, comparable to FIG. 2, of an embodiment of the invention.

FIG. 6 describes a different embodiment of the invention in which, in contrast to FIG. 2, back wall 110 is completely closed. Component 7 is retained vibrationally decoupled on flanges 114, located in depression T, at fastening points 73. If necessary, flanges 114 enable the creation of a greater distance to back wall 110. Further, a ventilation opening 116 is provided for pressure equalization.

This embodiment offers the best acoustic properties, but is not quite as compact as the solution according to FIG. 2.

In a departure from the exemplary embodiments, vibration exciter 8 can also be similarly mounted on front side 71 of plate-like component 7. A plurality of vibration exciters 8 can also be attached to the front and/or back side 71, 72 of plate-like component 7.

As is evident from FIG. 7, plate-like component 7 can be, for example, rectangular, especially approximately square, in outline. On the periphery, it has four tongue-like elements 70, which are connected integrally to component 7 and are provided with fastening points 73 at their ends in the form of openings. Clear spaces are labeled with the number 75.

Instead of on the periphery, tongue-like elements however can also be located farther inward on the surface of component 7, as indicated by way of example with the dashed lines by the reference numbers 70' and 75'. A fastening opening 74 for vibration exciter 8 (not shown here) can be seen in the center of component 7.

As a departure from this, FIG. 8 shows plate-like component 7 having an approximately circular shape in outline, which can be used preferentially especially in tight places.

Figure 9:
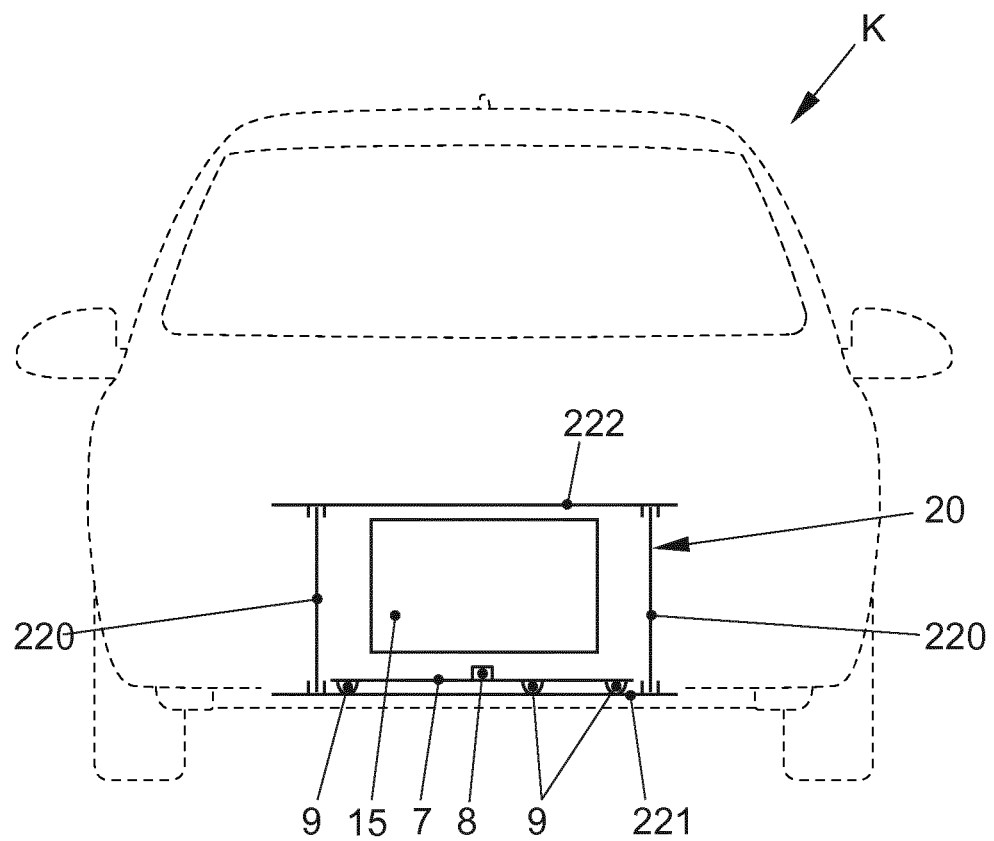
FIG. 9 illustrates the fastening of the component with the vibration exciter to a bottom wall of an engine shield.

FIG. 9 shows as a further embodiment a motor vehicle K, particularly a hybrid vehicle, with an engine block 15 (only an internal combustion engine is shown), which is shielded laterally by side walls 220 by a capsule-like engine shield 20, downwardly toward a roadbed (not shown) by a bottom wall 221, and upwardly by an upper wall 222.

Other necessary units and apertures for exhaust gas lines, supply lines, and the like are not shown.

As a departure from the illustrated exemplary embodiment, it is conceivable that engine shield 20 also comprises fewer or more of the illustrated walls 220 to 222.

In the present case, a plate-like component 7 is fastened by means of vibrationally decoupled fastening elements 9 to bottom wall 221, namely, on the inner side facing engine block 15. Component 7 in turn supports a vibration exciter 8 on its side facing engine 15. Vibration exciter 8 can operate, for example, piezoelectrically, electrostatically, magnetically, electromagnetically, or in some other suitable manner.

Figure 10:
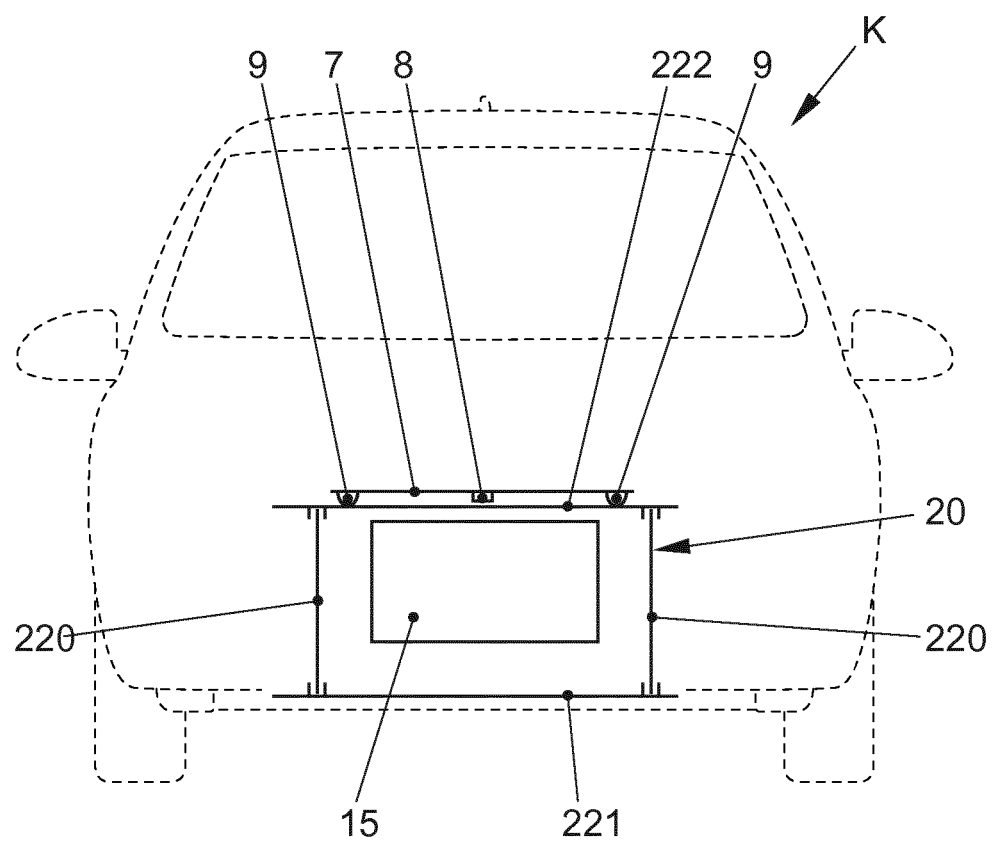
FIG. 10 illustrates the fastening of the component with the vibration exciter to an upper wall of an engine shield.

As a further embodiment a motor vehicle K with an engine shield 20 can be seen in FIG. 10; in contrast to FIG. 9, planar component 7, supporting vibration exciter 8, is fastened outside to upper wall 222 of engine shield 20. Here as well, vibration exciter 8 is again attached on the side, facing engine 15, of plate-like component 7.

Figure 11:
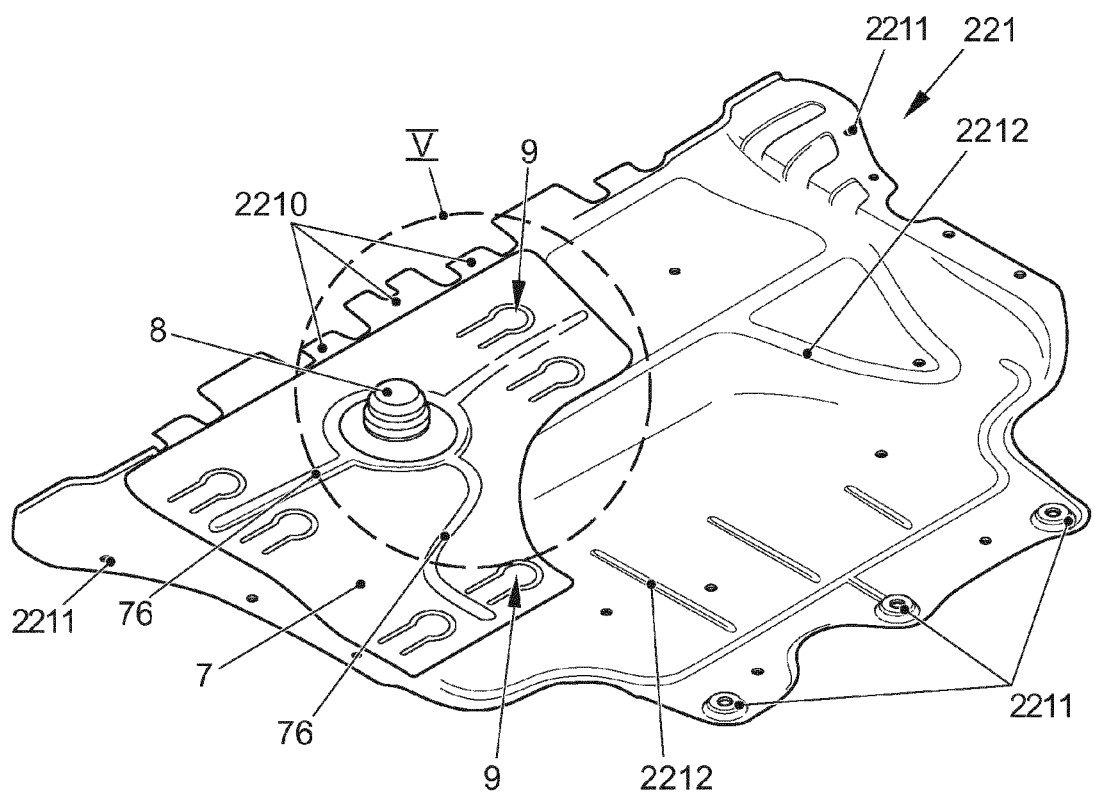
FIG. 11 shows a detailed illustration of the bottom wall according to FIG. 9.

FIG. 11 now shows a somewhat detailed illustration of bottom wall 221 according to FIG. 9.

Wall 221 has an outer, frame-like, peripheral fastening region, in which, on the one hand, retaining flange 2210 is located, which can be pushed onto the body, and, on the other, mounting grommets 2211 are located for screw connection to the body. Polypropylene (PP 20), for example, is highly suitable as a material for wall 221.

Reinforcement ribs 2212 are provided to achieve a desired degree of stiffness.

Plate-like component 7 supporting vibration exciter 8 is fastened, for example, screwed, to wall 221 in the front area of wall 221 via vibrationally decoupled fastening elements 9. Component 7 can also be provided with reinforcement ribs 76.

Necessary electrical lines for electrical control and the on-board voltage supply for vibration exciter 8 are not shown in greater detail.

Figure 12:
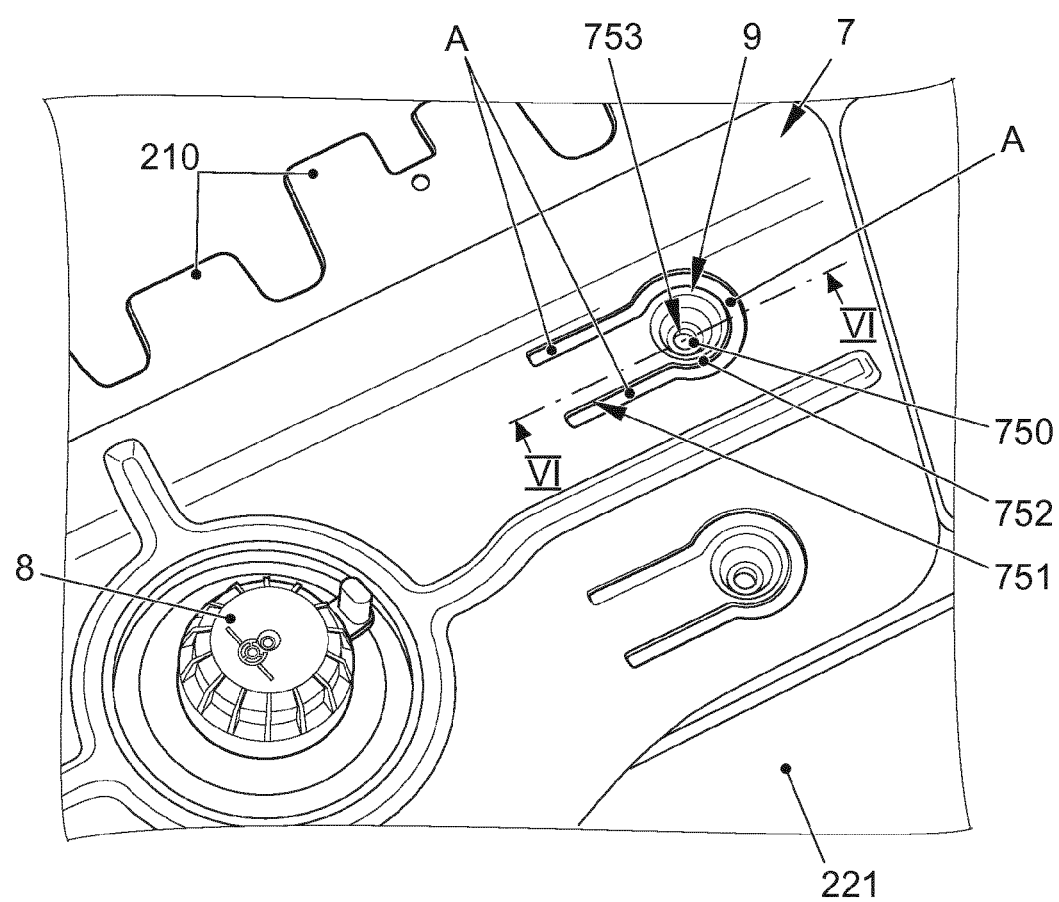
FIG. 12 shows a detailed illustration for FIG. 11.

As is evident from FIG. 12, the vibrationally decoupled fastening elements 9 are connected integrally as tongue-like elements 751 to component 7. They have a widened, round end area 752 with a cup-like depression 753.

On the bottom of cup-like depression 753, there is a fastening opening 750 at which end area 752 of tongue-like element 751 and thereby component 7 can be fastened, for example, screwed, to bottom wall 221 of engine shield 20. For this purpose, wall 221 also has a suitable fastening opening 2213.

Tongue-like elements 751 are formed by surrounding fastening openings 750 in each case by a slit-like recess A.

The invention is not limited to the above exemplary embodiment(s). These were used only for a general explanation of the core idea of the invention. On the contrary, the invention within its scope of protection can also assume embodiments and shapes different from those in the previously described exemplary embodiments or shapes. In this case, it can have in particular features that represent a combination of the individual features in the particular claims.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor vehicle comprising:
    at least one sound-generating system for generating an artificial engine noise, which has at least one electrically controllable vibration exciter;
    a component that is acoustically and/or vibrationally decoupled from a body of the motor vehicle, the vibration exciter being fastened to the component; and
    a retaining device to retain the component on the motor vehicle, the retaining device substantially covering the component.

2. The motor vehicle according to claim 1, wherein the vibration exciter is fastened to a side of the component that is substantially covered by the retaining device.

3. The motor vehicle according to claim 1, wherein the retaining device has an opening located in an area of the vibration exciter and surrounds the vibration exciter.

4. The motor vehicle according to claim 3, wherein the opening is closed by an air-permeable and flexible material.

5. The motor vehicle according to claim 4, wherein the air-permeable and flexible material is inserted into the opening of the retaining device to close the opening.

6. The motor vehicle according to claim 3, wherein the opening of the retaining device is aligned with the vibration exciter.

7. The motor vehicle according to claim 1, wherein the component is completely covered by the retaining device.

8. The motor vehicle according to claim 1, wherein the retaining device is formed as a single piece.

9. The motor vehicle according to claim 1, wherein, on the component, there are tongue-shaped elements integrally connected thereto.

10. The motor vehicle according to claim 1, wherein the component is fastened acoustically and/or vibrationally decoupled to the retaining device, and wherein the retaining device is fastened acoustically and/or vibrationally decoupled to another component of the motor vehicle.

11. The motor vehicle according to claim 1, wherein the retaining device has a depression into which the component retaining the vibration exciter is inserted.

12. The motor vehicle according to claim 1, wherein the component has an approximately circular shape in outline.

13. The motor vehicle according to claim 1, wherein the component is fastened to a support structure on which at least one radiator is retained.

14. The motor vehicle according to claim 1, wherein the component is fastened to an engine shield.

15. The motor vehicle according to claim 14, wherein the component is fastened to a bottom wall of the engine shield.

16. The motor vehicle according to claim 14, wherein the component is fastened to an upper wall of the engine shield.

17. The motor vehicle according to claim 1, further comprising a grill covering a front of the retaining part, such that the component is positioned between the grill and a back wall of the retaining part, and wherein the vibration exciter is positioned on a back side of the component, the back side of the component facing the back wall of the retaining part.

18. The motor vehicle according to claim 17, wherein the vibration exciter is positioned on the back side of the component such that the vibration exciter faces toward an engine of the motor vehicle.

19. The motor vehicle according to claim 1, wherein the retaining device substantially covers a back side of the component as well as lateral side edges of the component.

20. A support structure for a motor vehicle, said support structure retaining at least one radiator and at least one component connected to at least one vibration exciter, wherein the component is retained acoustically and/or vibrationally decoupled on a retaining device and the component is substantially covered by the retaining device.

* * * * *